United States Patent
Wang et al.

(10) Patent No.: US 11,500,073 B2
(45) Date of Patent: Nov. 15, 2022

(54) ACOUSTO-OPTICAL BEAM DEFLECTING UNIT FOR LIGHT DETECTION AND RANGING (LIDAR)

(71) Applicant: BEIJING VOYAGER TECHNOLOGY CO., LTD., Beijing (CN)

(72) Inventors: Chao Wang, Mountain View, CA (US); Lingkai Kong, Mountain View, CA (US); Yonghong Guo, Mountain View, CA (US); Wenbin Zhu, Mountain View, CA (US)

(73) Assignee: BEIJING VOYAGER TECHNOLOGY CO., LTD., Beijing (CN)

( * ) Notice: Subject to any disclaimer, the term of this patent is extended or adjusted under 35 U.S.C. 154(b) by 372 days.

(21) Appl. No.: 16/886,601

(22) Filed: May 28, 2020

(65) Prior Publication Data

US 2021/0373129 A1    Dec. 2, 2021

(51) Int. Cl.
| | |
|---|---|
| *G01S 7/48* | (2006.01) |
| *G01S 7/486* | (2020.01) |
| *G01S 7/481* | (2006.01) |
| *G01S 17/931* | (2020.01) |

(52) U.S. Cl.
CPC .......... *G01S 7/486* (2013.01); *G01S 7/4804* (2013.01); *G01S 7/4813* (2013.01); *G01S 17/931* (2020.01)

(58) Field of Classification Search
CPC ...... G01S 7/486; G01S 7/4804; G01S 7/4813; G01S 17/931; G01S 7/4816; G01S 7/4817; G01S 17/42
See application file for complete search history.

(56) References Cited

U.S. PATENT DOCUMENTS

2017/0307757 A1* 10/2017 Hinderling ............ G01S 7/4868

* cited by examiner

*Primary Examiner* — Tony Ko
(74) *Attorney, Agent, or Firm* — Bayes PLLC

(57) ABSTRACT

Embodiments of the disclosure provide receivers for light detection and ranging (LiDAR). In an example, a receiver includes a beam converging device, an AO beam deflecting unit, and a beam sensor. The beam converging device is configured to receive a laser beam from an object being scanned by the LiDAR and form an input laser beam. The AO beam deflecting unit is configured to generate a diffraction grating along a propagating direction of an acoustic wave, receive the input laser beam such that the input laser beam impinges upon the diffraction grating, and form an output laser beam towards the beam sensor. An angle between the input and the output laser beams is nonzero.

20 Claims, 8 Drawing Sheets

ACOUSTO-OPTICAL BEAM DEFLECTING UNIT FOR LIGHT DETECTION AND RANGING (LIDAR)

TECHNICAL FIELD

The present disclosure relates to a Light Detection and Ranging (LiDAR) system, and more particularly to, a LiDAR receiver having an acousto-optical (AO) beam deflecting unit.

BACKGROUND

LiDAR systems have been widely used in autonomous driving and producing high-definition maps. For example, LiDAR systems measure distance to a target by illuminating the target with pulsed laser light and measuring the reflected pulses with a sensor. Differences in laser return times and wavelengths can then be used to make digital three-dimensional (3-D) representations of the target. The laser light used for LiDAR scan may be ultraviolet, visible, or near infrared. Because using a narrow laser beam as the incident light from the scanner can map physical features with very high resolution, a LiDAR system is particularly suitable for applications such as high-definition map surveys.

The pulsed laser light beams emitted by a LiDAR system are typically directed to multiple directions to cover a field of view (FOV). As a result, LiDAR system requires a receiver that can receive the returned light signals from different directions. To realize this receiving requirement, most LiDAR systems implement one of two designs: (1) a rotational mirror to deflect the return light signals so that they are all received by a static detector, or (2) using an array of detectors to receive the returned light signals within an range of directions.

However, the performance of the conventional rotational mirror, such as galvo, polygon, and MEMS, is limited. In existing LiDAR receivers, it can be difficult to achieve both high-speed detection and large receiving aperture at the same time, features that are desired in a LiDAR receiver. However, in order to achieve a high LiDAR scanning speed, the mirror size has to be sufficiently small, which in turn limits the receiving aperture. Limited aperture leads to less receiving signal, which will limit the detection distance. On the other hand, if a large scanning mirror is used, the scanning speed will be limited, which results in a limited refresh rate of the LiDAR. In other words, in existing LiDAR receivers, there is a trade-off between the receiving aperture size and the scanning speed.

Embodiments of the disclosure address the above problems by an improved receiver having an AO beam deflecting unit for LiDAR.

SUMMARY

Embodiments of the disclosure provide a receiver for light detection and ranging LiDAR. The receiver includes a beam converging device, an AO beam deflecting unit, and a beam sensor. The beam converging device is configured to receive a laser beam from an object being scanned by the LiDAR and form an input laser beam. The AO beam deflecting unit is configured to generate a diffraction grating along a propagating direction of an acoustic wave, receive the input laser beam such that the input laser beam impinges upon the diffraction grating, and form an output laser beam towards the beam sensor. An angle between the input and the output laser beams is nonzero.

Embodiments of the disclosure also provide another receiver for LiDAR. The receiver includes an AO beam deflecting unit, a beam converging device, and a beam sensor. The AO beam deflecting unit is configured to generate a diffraction grating along a propagating direction of an acoustic wave, receive an input laser beam from an object being scanned by the LiDAR such that the input laser beam impinges upon the diffraction grating, and form an output laser beam towards a beam sensor. An angle between the input laser beam and the output laser beams is nonzero. The beam converging device is configured to receive the output laser beam and form a second input laser beam towards the beam sensor.

Embodiments of the disclosure also provide a method for receiving a laser beam in a LiDAR. The method includes the following operations. A travel direction of the laser beam is determined. The laser beam reflects from an object being scanned by the LiDAR to a beam sensor. In an AO deflector, a diffraction grating is generated along a propagating direction of an acoustic wave. The laser beam from the object is received by the AO deflector such that the laser beam impinges upon the diffraction grating. The laser beam is deflected by the AO deflector towards the beam sensor.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

The present disclosure is made in a three-dimensional coordinate system, with x-axis, y-axis, and z-axis representing the three dimensions. In the present disclosure, the "fast axis" is parallel to the z-axis, the "slow axis" is parallel to the y-axis, and the "optical axis" is parallel to the x-axis. The z-axis (e.g., the vertical axis/direction) can be perpendicular to the x-y plane (e.g., the horizontal/lateral plane), and the x-axis and the y axis can be perpendicular to each other. The x-axis/direction and the y-axis/direction can each be referred to as a lateral direction.

In the present disclosure, the "incident direction" of a light beam refers to the direction defined by the incident angle between the light beam and the surface normal of the object the light beam is incident on or exiting.

In the present disclosure, the term "nominal/nominally" refers to a desired, or target, value of a characteristic or parameter for a component or a process operation, set during the design phase of a product or a process, together with a range of values above and/or below the desired value. The range of values can be due to slight variations in manufacturing processes or tolerances. As used herein, the term "about" indicates the value of a given quantity that can vary based on a particular technology node associated with the subject semiconductor device. Based on the particular technology node, the term "about" can indicate a value of a given quantity that varies within, for example, 10-30% of the value (e.g., ±10%, ±20%, or ±30% of the value).

In the present disclosure, the distance between two objects, e.g., a lens and an AO beam deflecting unit, is defined to be the distance between the centers (e.g., geometric centers) of the objects.

Figure 1:
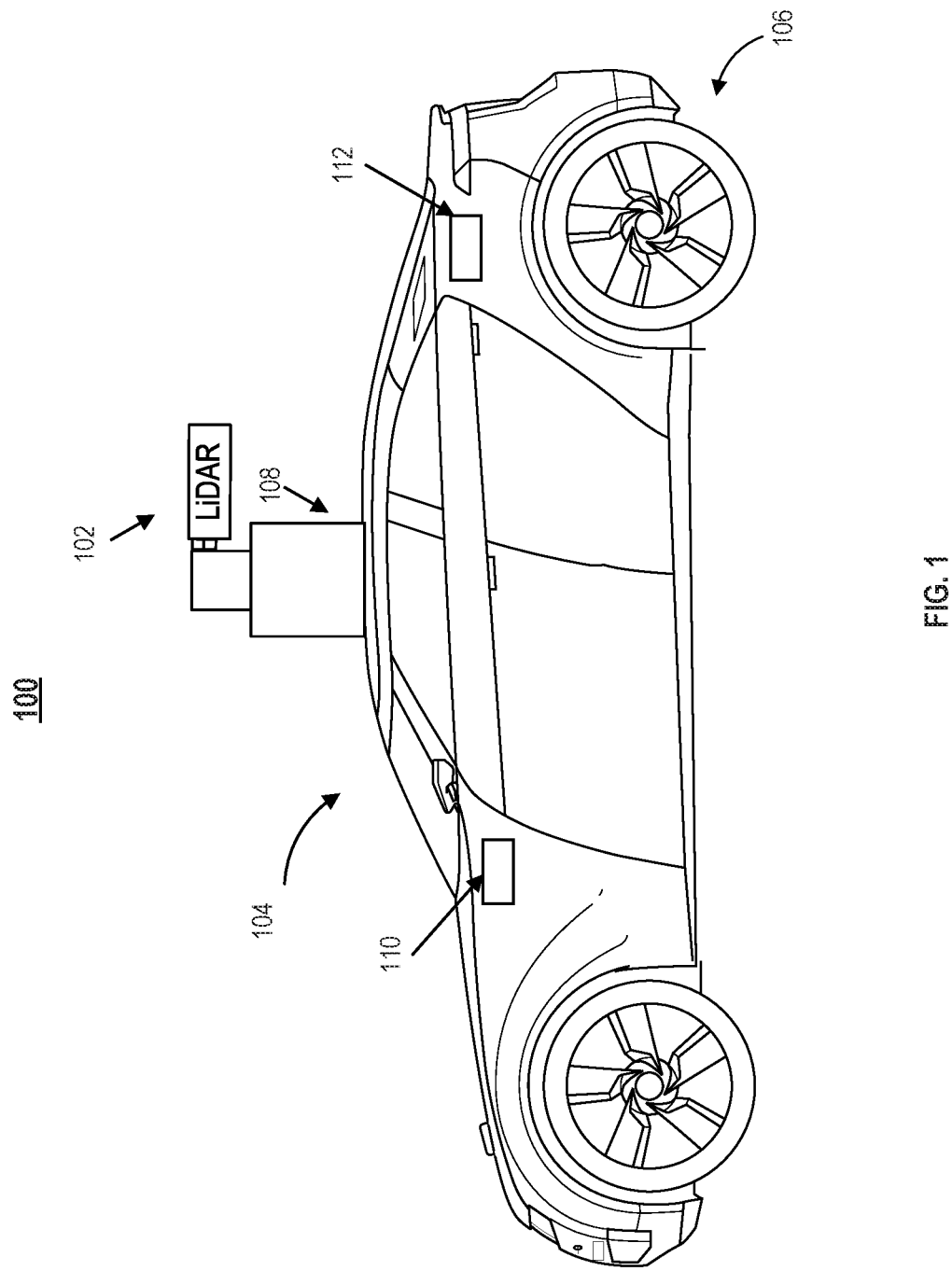
FIG. 1 illustrates a schematic diagram of an exemplary vehicle equipped with a LiDAR system, according to embodiments of the disclosure.

FIG. 1 illustrates a schematic diagram of an exemplary vehicle 100 equipped with a LiDAR system 102, according to embodiments of the disclosure. Consistent with some embodiments, vehicle 100 may be a survey vehicle configured for acquiring data for constructing a high-definition map or 3-D buildings and city modeling. It is contemplated that vehicle 100 may be any suitable moving vehicle such as an electric vehicle, a fuel cell vehicle, a hybrid vehicle, or a conventional internal combustion engine vehicle. Vehicle 100 may have a body 104 and at least one wheel 106. Body 104 may be any body style, such as a sports vehicle, a coupe, a sedan, a pick-up truck, a station wagon, a sports utility vehicle (SUV), a minivan, or a conversion van. In some embodiments of the present disclosure, vehicle 100 may include a pair of front wheels and a pair of rear wheels, as illustrated in FIG. 1. However, it is contemplated that vehicle 100 may have less wheels or equivalent structures that enable vehicle 100 to move around. In some embodiments of the present disclosure, vehicle 100 may be configured to be operated by an operator occupying the vehicle, remotely controlled, and/or autonomous.

As illustrated in FIG. 1, vehicle 100 may be equipped with LiDAR system 102 mounted to body 104 via a mounting structure 108. Mounting structure 108 may be an electromechanical device installed or otherwise attached to body 104 of vehicle 100. Vehicle 100 may be additionally equipped with a sensor 110 inside or outside body 104 using any suitable mounting mechanisms. It is contemplated that the manners in which LiDAR system 102 or sensor 110 can be equipped on vehicle 100 are not limited by the example shown in FIG. 1 and may be modified depending on the types of LiDAR system 102 and sensor 110 and/or vehicle 100 to achieve desirable 3-D sensing performance Consistent with some embodiments, LiDAR system 102 and sensor 110 may be configured to capture data as vehicle 100 moves along a trajectory. For example, a transmitter of LiDAR system 102 is configured to scan the surrounding and acquire point clouds. LiDAR system 102 measures distance to a target by illuminating the target with pulsed laser light and measuring the reflected pulses with a receiver. The laser light used for LiDAR system 102 may be ultraviolet, visible, or near infrared. In some embodiments of the present disclosure, LiDAR system 102 may capture point clouds. As vehicle 100 moves along the trajectory, LiDAR system 102 may continuously capture data. Each set of scene data captured at a certain time range is known as a data frame.

As illustrated in FIG. 1, vehicle 100 may be additionally equipped with sensor 110, which may include sensors used in a navigation unit, such as a Global Positioning System (GPS) receiver and one or more Inertial Measurement Unit (IMU) sensors.

Consistent with the present disclosure, vehicle 100 may include a local controller 112 inside body 104 of vehicle 100 or communicate with a remote computing device, such as a server (not illustrated in FIG. 1), for controlling the operations of LiDAR system 102 and sensor 110. In some embodiments of the present disclosure, controller 112 may have different modules in a single device, such as an integrated circuit (IC) chip (implemented as an application-specific integrated circuit (ASIC) or a field-programmable gate array (FPGA)), or separate devices with dedicated functions. In some embodiments of the present disclosure, one or more components of controller 112 may be located inside vehicle 100 or may be alternatively in a mobile device, in the cloud, or another remote location. Components of controller 112 may be in an integrated device or distributed at different locations but communicate with each other through a network (not shown).

Figure 2:
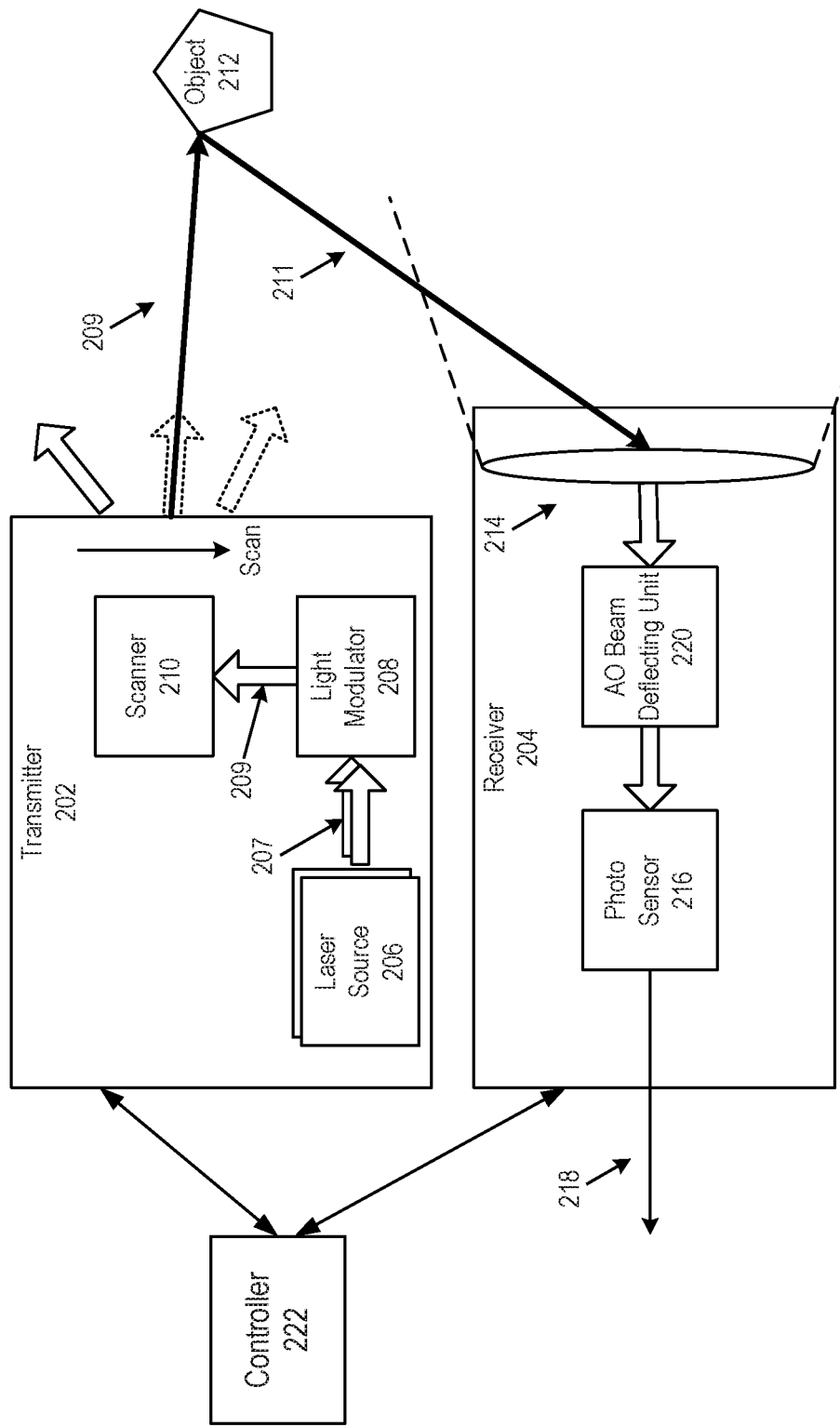
FIG. 2 illustrates a block diagram of an exemplary LiDAR system having a receiver with an AO beam deflecting unit, according to embodiments of the disclosure.

FIG. 2 illustrates a block diagram of an exemplary LiDAR system 102 having a receiver 204 with an AO beam deflecting unit 220, according to embodiments of the disclosure. LiDAR system 102 may include transmitter 202, receiver 204, and a controller 222. Transmitter 202 may emit laser beams within a scan angle. Transmitter 202 may include one or more laser sources 206, light modulator 208, and a scanner 210.

As part of LiDAR system 102, transmitter 202 can sequentially emit a stream of pulsed laser beams in different directions within its scan angle, as illustrated in FIG. 2. A laser source 206 may be configured to provide a native laser beam 207 in a respective incident direction to light modulator 208. In some embodiments of the present disclosure, each laser source 206 may generate one or more pulsed laser beams in the ultraviolet, visible, or near infrared wavelength range.

Referring back to FIG. 2, laser source 206 can include any suitable laser emitting device(s) such as one or more pulsed laser diode (PLD). Depending on the light-emitting materials (e.g., semiconductor materials) in the laser emitting devices, the wavelength of native laser beam 207 provided by a PM may he any suitable value(s) that can be detected by receiver 204. For example, the wavelength of native laser beam 207 may be smaller than 1,100 nm, such as 405 nm, between 445 nm and 465 nm, between 510 nm and 525 nm, 532 nm, 635 nm, between 650 nm and 660 nm, 670 nm, 760 nm, 785 nm, 808 nm, 848 nm, or 905 nm. Light modulator 208 can spatially collimate and combine multiple laser beams provided by multiple laser sources 206 into a single combined laser beam and minimize the beam divergence in the combined laser beam.

Referring back to FIG. 2, scanner 210 may be configured to emit combined laser beam 209 to an object 212 in a scanning direction. Scanner 210 may scan object 212 using combined laser beam 209 combined by light modulator 208, within a scan angle at a scan rate. Object 212 may be made of a wide range of materials including, for example, non-metallic objects, rocks, rain, chemical compounds, aerosols, clouds and even single molecules. The wavelength of combined laser beam 209 may vary based on the composition of object 212. At each time point during the scan, scanner 210 may emit combined laser beam 209 to object 212 in the scanning direction within the scan angle. Scanner 210 may also include optical components (e.g., lenses, mirrors) that can focus pulsed laser light into a narrow laser beam to increase the scan resolution and range of object 212.

As part of LiDAR system 102, receiver 204 may be configured to detect a returned laser beam 211 from object 212 in a direction other than the scanning direction. After collecting and sensing the laser beams, receiver 204 can output an electrical signal reflecting the intensity of the returned laser beams. Upon contact, combined laser beam 209 can be reflected by object 212 via backscattering, such as Rayleigh scattering, Mie scattering, Raman scattering, and fluorescence, forming returned laser beam 211 towards receiver 204. Returned laser beam 211 may be returned from object 212 and have the same wavelength as combined laser beam 209. As illustrated in FIG. 2, receiver 204 may include a lens 214, a photosensor 216, and an AO beam deflecting unit 220, consistent with the embodiments of the present disclosure. For illustrative purposes, in FIG. 2, AO beam deflecting unit 220 is depicted to be positioned between lens 214 and photosensor 216. As described below, AO beam deflecting unit 220 can be placed between lens 214 and photosensor 216, and/or between object 212 and lens 214. The actual placement of AO beam deflecting unit 220 should not be limited by the depiction in the figures. Lens 214, as a beam converging device, may be configured to collect light from a respective direction in its field of view (FOV). At each time point during the scan, returned laser beam 211 may be collected by receiver 204, e.g., by lens 214 or AO beam deflecting unit 220, as described in detail as follows.

As previously explained, in an existing LiDAR system, high scanning speed and large scanning aperture can be difficult to achieve at the same time due to limitations of the conventional receiver. The existing receiver often includes a rotational mirror that can rotate to alter the travel direction of a returned laser beam after it passes the lens such that the reflected laser beam travels towards the photosensor. The rotational mirror can have several limitations. For example, the rotational mirror is often composed of instruments such as a mirror galvanometer, a polygon mirror, a micro-electromechanical system (MEMS), and the like. The limitations of the rotational mirror, consisting of these instruments, can be related to the size of the rotational mirror. If the LiDAR system has a high scanning speed (e.g., and high refreshing rate), the size of the rotational mirror needs to be desirably small so that the rotational mirror can be quickly adjusted/oriented to a desired angle to deflect the returned laser beam to the photosensor. However, a rotational mirror with a relatively small size often has a smaller receiving aperture, limiting the detection distance. That is, the performance of an existing receiver is limited by this trade-off between high scanning speed and large scanning aperture.

The present disclosure provides a LiDAR system with an improved receiver by employing an AO beam deflecting unit. With the AO beam deflecting unit, the disclosed LiDAR receiver provides improved accommodation to high scanning speed and larger scanning aperture at the same time. Compared to an existing LiDAR system, the performance of the receiver is less (or not) limited by the size of the AO beam deflecting unit. The AO beam deflecting unit may include one or more AO deflectors, which can be placed at any suitable locations along the travel path of the returned laser beam to deflect the returned laser beam towards the photosensor. In various applications, by configuring/optimizing the number, positions, and orientations of each AO deflector in the receiver, the returned laser beam can be deflected to a smaller sensing area, compared to an existing LiDAR system. As a result, a photosensor with a smaller photodetector array or even a single photodetector, can be used for the light detection and collection.

As described in the embodiments of the present disclosure, the light deflection functions of the AO beam deflecting unit is based on the deflection angle of the AO beam deflecting unit. The deflection angle is correlated to the refractive index of the AO beam deflecting unit, which is modulated by an acoustic signal (e.g., an acoustic waveform) applied to the AO beam deflecting unit. That is, the modulated refractive index is a function of the acoustic signal applied to the AO beam deflecting unit. The acoustic signal is varied to dynamically modulate the refractive index. In various embodiments, the refractive index of the AO beam deflecting unit is dynamically modulated and/or adjusted to receive each returned laser beam such that the returned laser beam can be timely deflected to the photosensor at a desired travel direction. The light deflection function of the AO beam deflecting unit is thus determined by its material's acousto-electric response time to an acoustic signal, rather than its size. The response time can be desirably short or shorter than the time to adjust a rotational mirror in an existing receiver. In the meantime, the size of the AO beam deflecting unit can be designed smaller than a rotational mirror, allowing the size of the LiDAR system to be smaller. The AO beam deflecting unit thus improves the light energy collection in a LiDAR system.

Figure 3A:
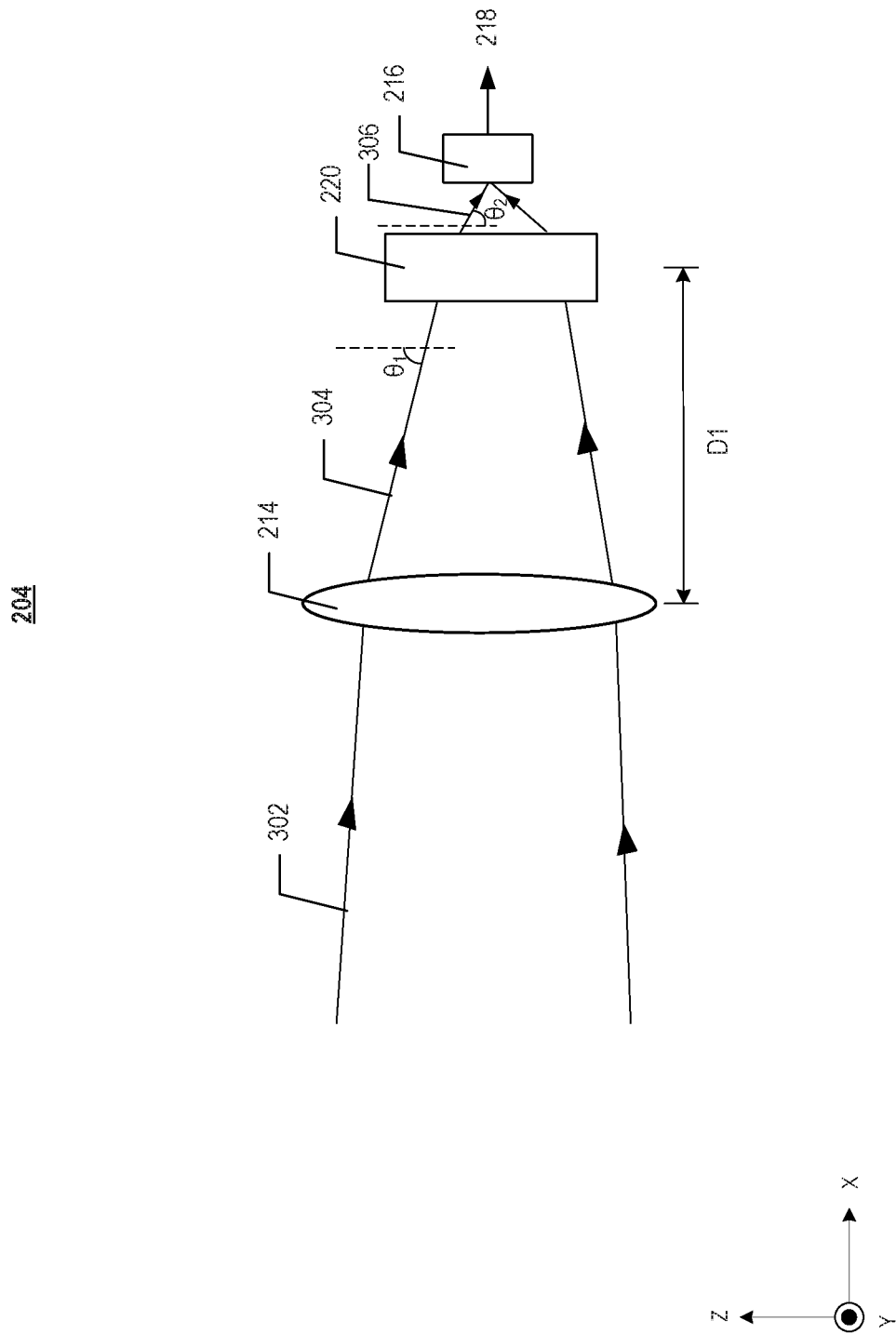
FIG. 3A illustrates a receiver having an exemplary AO beam deflecting unit, according to embodiments of the disclosure.
Figure 3B:
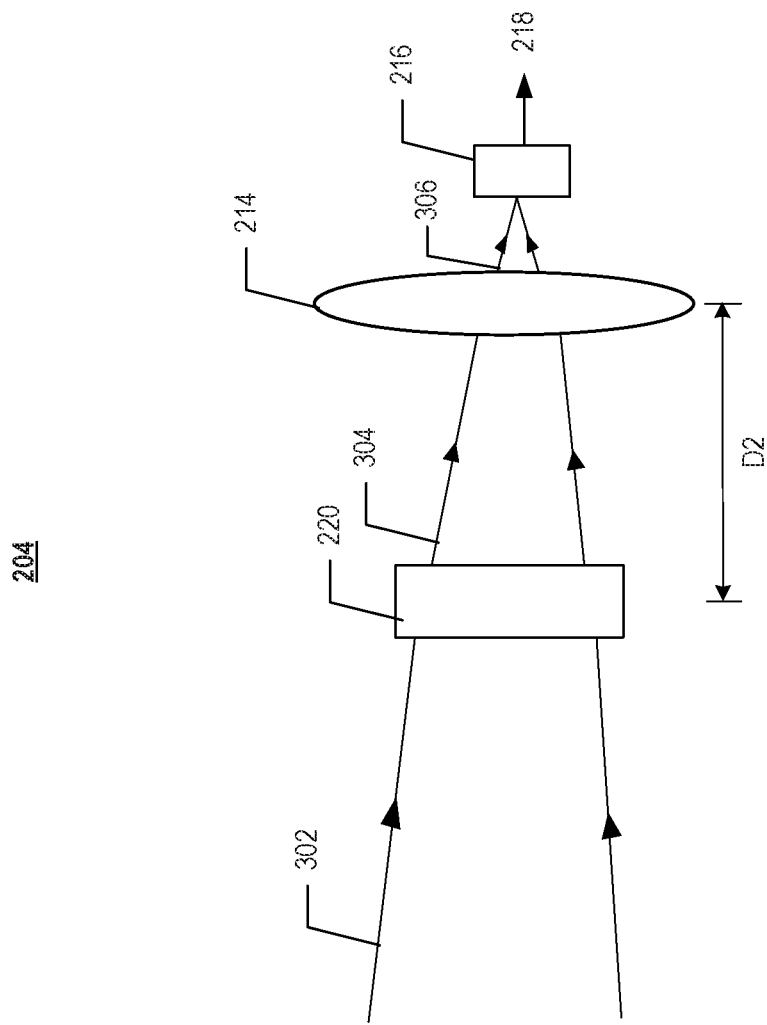
FIG. 3B illustrates another receiver having an exemplary AO beam deflecting unit, according to embodiments of the disclosure.
Figure 3C:
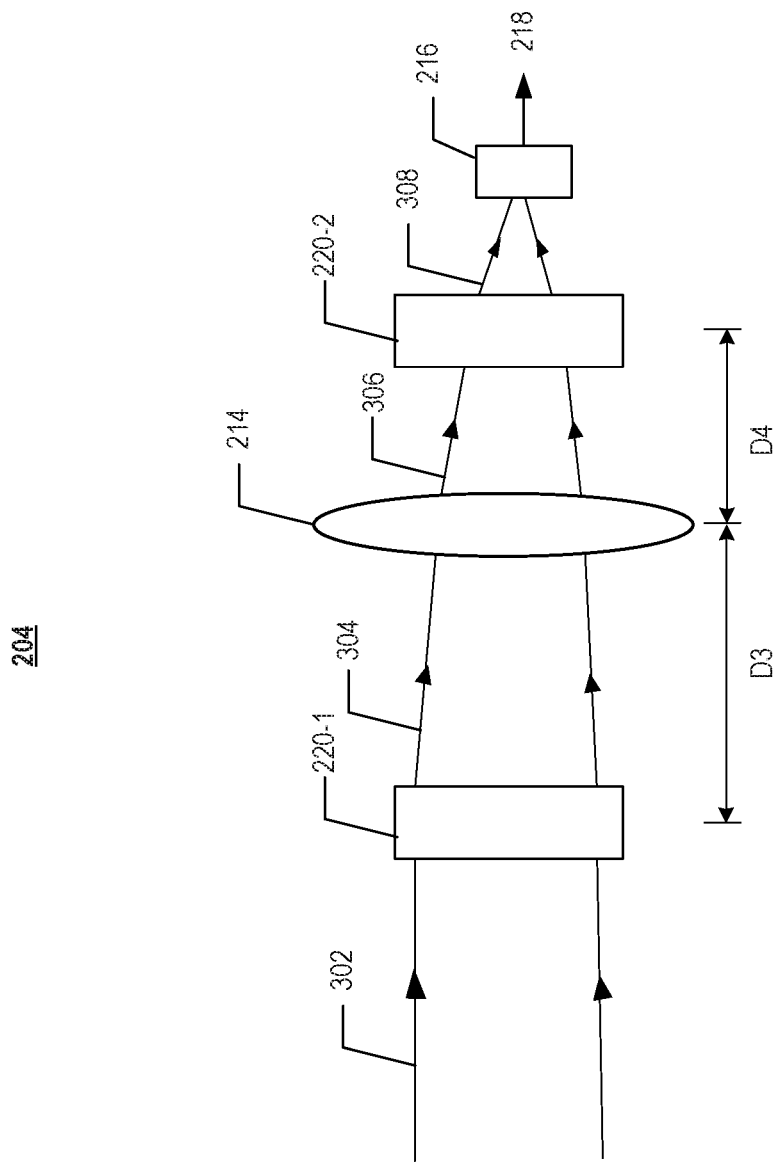
FIG. 3C illustrates another receiver having an exemplary AO beam deflecting unit, according to embodiments of the disclosure.

FIGS. 3A, 3B, and 3C each illustrates an exemplary configuration of receiver 204, according to some embodiments. As shown in FIG. 3A, AO beam deflecting unit 220 may be placed between lens 214 and photosensor 216. A first laser beam 302 may represent returned laser beam 211. First laser beam 302 may be incident on and converged by lens 214, forming a second laser beam 304. Second laser beam 304 may be incident on and deflected by AO beam deflecting unit 220, forming a third laser beam 306. Third laser beam 306 may be collected by photosensor 216, which outputs an electrical signal 218 that can be detected by other hardware and/or software, such as controller 222.

AO beam deflecting unit 220 may deflect an input laser beam (e.g., second laser beam 304) to form an output laser beam (e.g., third laser beam 306), which travels towards photosensor 216. That is, AO beam deflecting unit 220 may change the travel direction of the input laser beam and deflect the input laser beam towards photosensor 216 such that the input and output laser beams do not travel in parallel. The angle between the input laser beam and the output laser beam is represented by the difference between the travel directions of the input and output laser beams. In some embodiments, the angle is a nonzero value.

Referring back to FIG. 3A, second laser beam 304 and third laser beam 306 have different travel directions. For ease of illustration, as shown in FIG. 3A, the acute angle between the travel path of second laser beam 304 and the vertical direction (e.g., the z-axis) is denoted by $\theta_1$, and the acute angle between the travel direction of third laser beam 306 and the vertical direction is denoted by $\theta_2$. Depending on the position of photosensor 216, $\theta 1$ may be greater than or smaller than $\theta 2$. In the embodiment shown in FIG. 3A, $\theta 1$ is greater than $\theta 2$. The deflection angle of AO beam deflecting unit 220 may be equal to the angle between the input laser beam and the output laser beam. In some embodiments, the deflection angle is equal to the difference between $\theta_1$ and $\theta_2$, i.e., $(\theta_1-\theta_2)$.

In some embodiments, the position of AO beam deflecting unit 220 is adjustable (e.g., can be optimized) such that second laser beam 304 can be received on a desired area of AO beam deflecting unit 220. In some embodiments, the position of AO beam deflecting unit 220 is adjusted such that a maximum portion (e.g., all) of second laser beam 304 is deflected. In some embodiments, the optimized position of AO beam deflecting unit 220 also allows third laser beam 306 to be incident on a desired area of photosensor 216. As shown in FIG. 3A, a distance D1 between lens 214 and AO beam deflecting unit 220 can be determined or optimized to be a value that ensures any input laser beam of AO beam deflecting unit 220 (e.g., second laser beam 304) to be deflected onto photosensor 216. In various embodiments, D1 can be a constant value or a variable value. In some embodiments, to adjust D1, AO beam deflecting unit 220 can be coupled to a motor and/or an actuator that can move AO beam deflecting unit 220 during a laser light detection process. In some embodiments, based on the travel direction of first laser beam 302 and/or the relative positions between lens 214 and photosensor 216, the motor/actuator is configured to move AO beam deflecting unit 220, e.g., along the x-axis and/or the y-axis, to timely deflect second laser beam 304 such that third laser beam 306 impinges on photosensor 216. In some embodiments, the motor/actuator is configured to rotate AO beam deflecting unit 220. The motor/actuator may be controlled by a controller 222.

Figure 4:
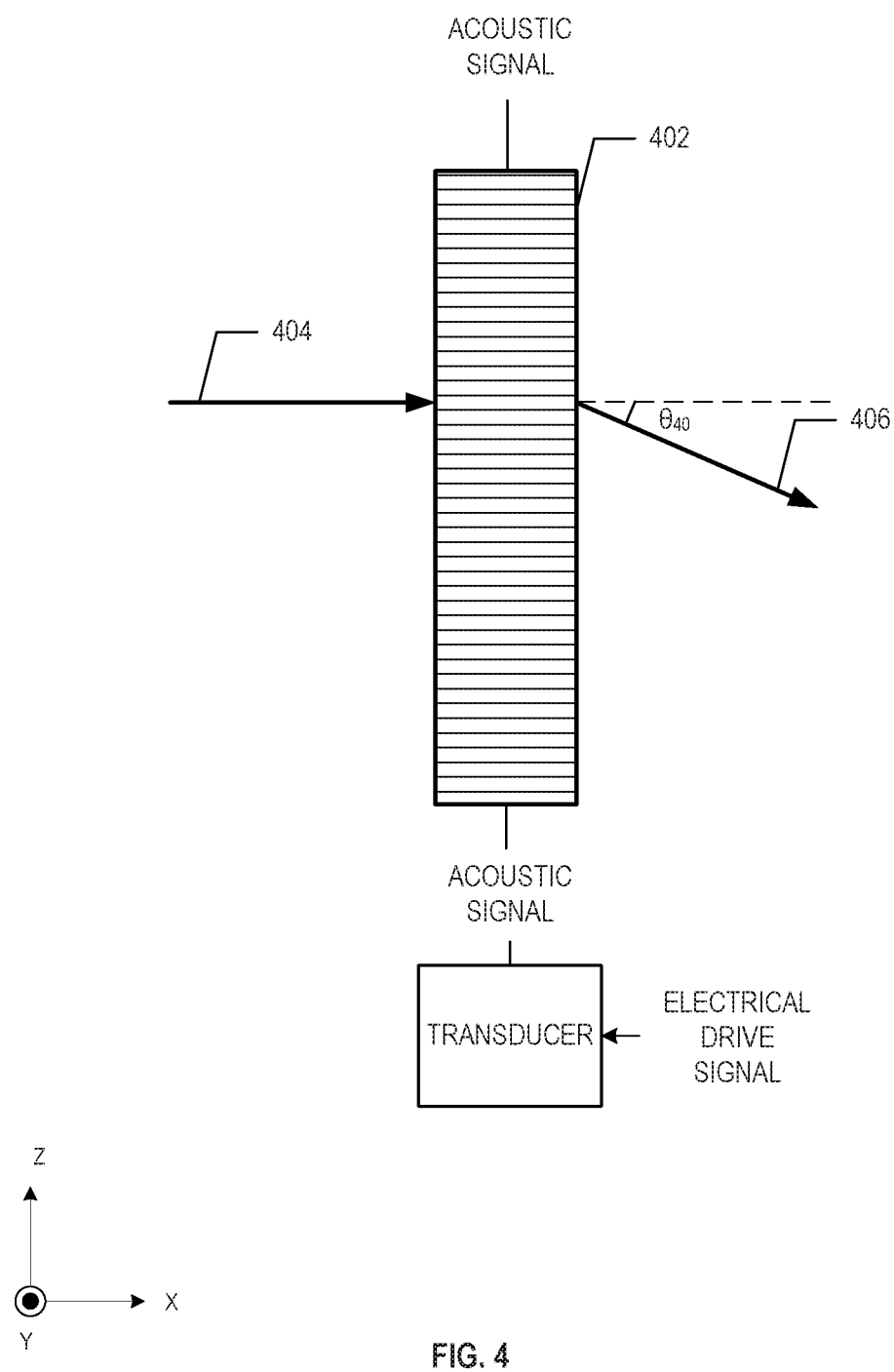
FIG. 4 illustrates a schematic diagram of an exemplary AO beam deflecting unit, according to embodiments of the disclosure.
Figure 5:
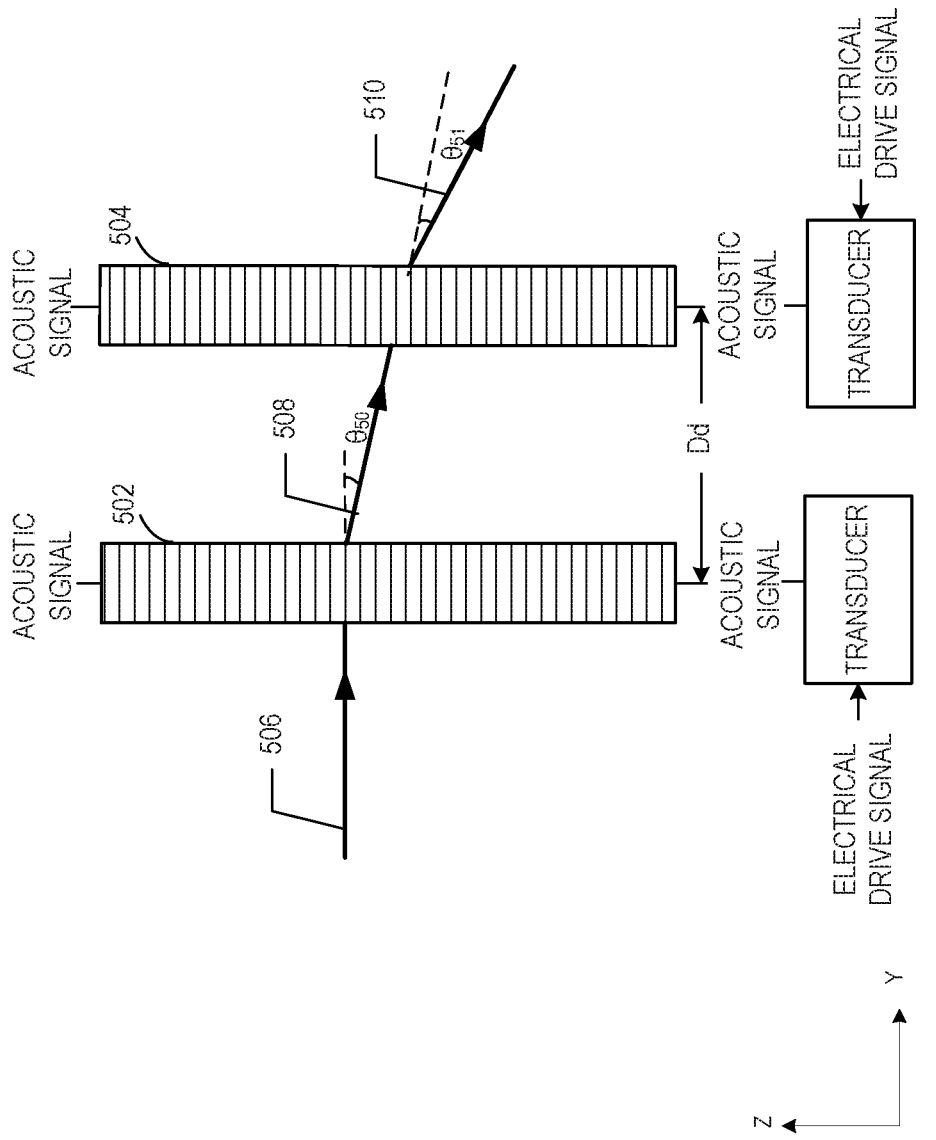
FIG. 5 illustrates a schematic diagram of another exemplary AO beam deflecting unit, according to embodiments of the disclosure.

The deflection angle of AO beam deflecting unit 220 can at least be partially determined by the configuration and working mechanism of AO beam deflecting unit 220. In various embodiments, AO beam deflecting unit 220 includes one or more AO defectors, each having a respective deflection angle. The deflection angle of AO beam deflecting unit 220 may be a combination (e.g., a sum) of the deflection angles of the individual AO deflectors. FIGS. 4 and 5 illustrate schematic views of AO beam deflecting unit 220 with a single AO deflector and a pair of AO deflectors, respectively. In various embodiments, AO beam deflecting unit 220 may also include more than two AO deflectors. However, because embodiments of AO beam deflecting unit 220 with more than two AO deflectors can be explained in a manner similar to that in FIG. 5, these embodiments are not described in detail. The number of AO deflectors in AO beam deflecting unit 220 thus should not be limited by the illustrated embodiments of the present disclosure.

Referring to FIG. 4, AO beam deflecting unit 220 may include an AO deflector 402. An input laser beam 404 may be received by AO deflector 402 on one side. Input laser beam 404 may be deflected by AO deflector 402 and exiting from the other side, forming an output laser beam 406. A deflection angle, e.g., between input and output laser beams 404 and 406, is represented by $\theta_{40}$. AO deflector 402 may be made of any suitable AO material(s) of which the refractive indices can be modulated by an acoustic signal. For example, AO deflector 402 may be made of germanium (Ge), doped glass, $Ge_{33}As_{12}Se_{55}$, $As_2S_3$, $PbMoO_4$, $TeO_2$, and/or $SiO_2$. In operation, an acoustic signal is applied to and propagate in AO deflector 402. The acoustic signal may be generated by a transducer coupled to AO deflector 402. The transducer may also be coupled to an electronic signal generator (not shown) that generates and transmits an electrical drive signal to the transducer. The electrical drive signal may have a frequency that can cause the acoustic signal to have a desired frequency that partially determines the deflection angle. For ease of illustration, only one transducer and one electrical drive signal are shown to be coupled to one end of AO deflector 402 in the figures. In various embodiments, more than one transducers and/or more than one electrical drive signals can be coupled to both ends of AO deflector 402 (e.g., along the z-axis). The working mechanism of acoustic deflector 402 is described in detail as follows.

In operation, the electronic signal generator may generate the electrical drive signal that has an electrical frequency, which causes the transducer to generate an acoustic signal of a desired acoustic frequency in AO deflector 402. The electrical drive signal may be transmitted to the transducer, which generates the acoustic signal in response to the received electrical drive signal. An acoustic frequency f of the acoustic signal can cause AO deflector 402 to have a modulated refractive index. The transducer may then transmit the acoustic signal, in the form of an acoustic wave, into AO deflector 402. The acoustic waveform may then propagate across the body of AO deflector 402. A diffraction grating may then be generated by an acousto-electric effect in which pressure variations along the propagating acoustic wave cause corresponding variations in the refractive index of the transmission material/medium. The pattern of diffraction grating may correspond to the acoustic frequency. The refractive index of AO deflector 402, a modulated refractive index, may then be determined by the electrical frequency. The deflection angle of an AO deflector, such as AO deflector 402, is calculated by the equation $$\Delta\theta_d = \frac{\lambda}{v}\Delta f,$$

in which $\Delta\theta_d$ is the deflection angle, $\lambda$ is the wavelength of input laser beam in vacuum, $v$ is the acoustic velocity, and $\Delta f$ is the change of acoustic frequency.

Referring to FIG. 4, based on the equation, the electrical frequency can be determined, varied, or adjusted, to obtain a desired deflection angle $\theta_{40}$. For ease of illustration, the wavelength of the input laser beam is assumed to stay constant. In some embodiments, the electrical frequency can be kept constant to cause a constant deflection angle. In some embodiments, the electrical frequency can be varied to cause a changing or variable deflecting angle. Thus, reflection angle $\theta_{40}$ may be determined based on the travel direction of input laser beam 404 and a desired direction of output laser beam 406 (e.g., towards photosensor 216).

In some embodiments, AO deflector 402 is coupled to a motor/actuator. In some embodiments, based on the travel direction of input laser beam 404 and/or the relative positions between lens 214 and photosensor 216, the motor/actuator is configured to move AO deflector 402, e.g., along the x-axis and/or the y-axis, to timely deflect input laser beam 404 such that output laser beam 406 impinges on photosensor 216. In some embodiments, the motor/actuator is configured to rotate AO deflector 402 so that the value of $\theta_{40}$ can be further adjusted/optimized.

Referring to FIG. 5, AO beam deflecting unit 220 may include two AO deflectors 502 and 504. Each one of AO deflectors 502 and 504 may be made of germanium (Ge), doped glass, $Ge_{33}As_{12}Se_{55}$, $As_2S_3$, $PbMoO_4$, $TeO_2$, and/or $SiO_2$. The working mechanism of each one of AO deflectors 502 and 504 may be the same as or similar to that of AO deflector 402, and the detailed description is not repeated herein. As shown in FIG. 5, an input laser beam 506 may first be received by AO deflector 502, and be deflected by a deflection angle $\theta_{50}$ to form an intermediate laser beam 508. Intermediate laser beam 508 may further be incident on AO deflector 504 and deflected by a deflection angle $\theta_{51}$, forming an output laser beam 510. The angle between input and output laser beams 506 and 510 may be referred to as the total deflection angle (or deflection angle of AO beam deflecting unit 220). The total deflection angle may be a combination of the respective deflection angles of AO deflectors 502 and 504. In some embodiments, the deflection angle of AO beam deflecting unit 220 is equal to $(\theta_{50}+\theta_{51})$.

In various embodiments, AO deflectors 502 and 504 may be the same or different. For example, AO deflectors 502 and 504 may include the same material(s) or different materials. Electric signals of the same electrical frequency or different electrical frequencies may be applied to AO deflectors 502 and 504. Accordingly, the acoustic frequencies propagating in AO deflectors 502 and 504 may be the same or different. As a result, the diffraction gratings in AO deflectors 502 and 504 can be the same or different, and $\theta_{50}$ may be the same as $\theta_{51}$ or different from $\theta_{51}$. The specific values of deflection angles $\theta_{50}$ and $\theta_{51}$, and the deflection angle of AO beam deflecting unit 220 should be determined based on the applications. In some embodiments, values of $\theta_{50}$, $\theta_{51}$, and $(\theta_{50}+\theta_{51})$ are determined/configured such that output laser beam 510 travels towards photosensor 216. In some embodiments, the deflection angle of AO beam deflecting unit 220 shown in FIG. 5 is greater than the deflection angle of AO beam deflecting unit 220 shown in FIG. 4.

A distance between AO deflectors 502 and 504 is represented by Dd in FIG. 5. The value of Dd may be determined to control output laser beam 510 to travel in a desired direction, e.g., towards photosensor 216. In some embodiments, AO deflectors 502 and 504 are each coupled to a motor/actuator. In some embodiments, based on the travel directions of input laser beam 506 and intermediate laser beam 508, and/or the relative positions between lens 214 and photosensor 216, the motor/actuators are configured to move AO deflectors 502 and 504, e.g., along the x-axis and/or the y-axis, to timely deflect input laser beam 506 and intermediate laser beam 508 such that output laser beam 510 impinges on photosensor 216. In various embodiments, Dd can be a constant value or a changing/variable value. In some embodiments, the motor/actuator is configured to respectively rotate AO deflectors 502 and 504 so that the values of $\theta_{50}$ and $\theta_{51}$ can be further adjusted/optimized.

FIG. 3B illustrates another configuration of receiver 204, according to some embodiments. As shown in FIG. 3B, AO beam deflecting unit 220 may be placed between object 212 (referring to FIG. 2) and lens 214. First laser beam 302 may represent returned laser beam 211. First laser beam 302 may be incident on and deflected by AO beam deflecting unit 220, forming second laser beam 304. Second laser beam 304 may be incident on and converged by lens, forming third laser beam 306. Third laser beam 306 may be collected by photosensor 216, which outputs an electrical signal 218 that can be detected by other hardware and/or software, such as controller 222.

Similar to AO beam deflecting unit 220 illustrated in FIG. 3A, first laser beam 302 and second laser beam 304 may respectively be the input and output laser beams of AO beam deflecting unit 220. Second laser beam 304 may be deflected by a deflection angle of AO beam deflecting unit 220 before being received by lens 214. As described in FIGS. 4 and 5, the deflection angle of AO beam deflecting unit 220 may be equal to the deflection angle of a single AO deflector or a combination of deflection angles of a plurality of AO deflectors. A distance between AO beam deflecting unit 220 and lens 214 may be D2, which can be adjusted through a motor/actuator coupled to AO beam deflecting unit 220, similar to D1. Also, the orientation of AO beam deflecting unit 220 can be adjusted/optimized by rotating AO beam deflecting unit 220 using the motor/actuator. The details of the working mechanism described in connection with FIGS. 3A, 4, and 5 may also apply to AO beam deflecting unit 220 in FIG. 3B, and therefore are not repeated herein.

FIG. 3C illustrates another configuration of receiver 204, according to some embodiments. Different from the configurations illustrated in FIGS. 3A and 3B, receiver 204 in FIG. 3C includes two AO beam deflecting units 220-1 and 220-2. As shown in FIG. 3C, AO beam deflecting unit 220-1 may be placed between object 212 (like in FIG. 3B) and lens 214, and AO beam deflecting unit 220-2 may be placed between lens 214 and photosensor 216 (like in FIG. 3A). First laser beam 302 may represent returned laser beam 211. First laser beam 302 may be incident on and deflected by AO beam deflecting unit 220-1, forming a second laser beam 304. Second laser beam 304 may be incident on and converged by lens 214, forming a third laser beam 306. Third laser beam 306 may be incident on and deflected by AO beam deflecting unit 220-2, forming a fourth laser beam 308. Fourth laser beam 308 may be collected by photosensor 216, which outputs an electrical signal 218 that can be detected by other hardware and/or software, such as controller 222.

Similar to those illustrated in FIGS. 3A and 3B, first laser beam 302 and second laser beam 304 of FIG. 3C may respectively be the input and output laser beams of AO beam deflecting unit 220-1, and third laser beam 306 and fourth laser beam 308 may respectively be the input and output laser beams of AO beam deflecting unit 220-2. Second laser beam 304 may be deflected by a deflection angle of AO beam deflecting unit 220-1 before being received by lens 214, and fourth laser beam 308 may be deflected by a deflection angle of AO beam deflecting unit 220-2 before being received by photosensor 216. Referring back to the descriptions of FIGS. 4 and 5, the deflection angle of AO beam deflecting units 220-1 and 220-2 may respectively be equal to the deflection angle of a single AO deflector or a combination of deflection angles of a plurality of AO deflectors in the respective AO beam deflecting unit. In various embodiments, the deflection angles of AO beam deflecting units 220-1 and 220-2 can be the same or different. The combination of the deflection angles of AO beam deflecting units 220-1 and 220-2 causes output laser beam 308 to travel towards and be received by photosensor 216.

A distance between AO beam deflecting unit 220-1 and lens 214 may be D3, and a distance between lens 214 and AO beam deflecting unit 220-2 may be D4. D3 and D4 can each be adjusted through a respective motor/actuator coupled to AO beam deflecting units 220-1 and 220-2, similar to D1. Also, the orientation of AO beam deflecting units 220-1 and 220-2 can be adjusted/optimized by rotating AO beam deflecting units 220-1 and/or 220-2 using the motors/actuators. The details of the working mechanism described in connection with FIGS. 3A, 4, and 5 can also apply to AO beam deflecting units 220-1 and 220-2 in FIG. 3C, and therefore are not repeated herein.

Photosensor 216 may include any photo-sensitive material that can convert light (i.e., photons) into an electric current (e.g., electrical signal 218). Photosensor 216 can also be referred to as a beam sensor. The electric current is generated when photons are absorbed in the photodiode. By using AO beam deflecting units, returned laser beam 211 can be quickly and effectively detected by photosensor 216.

High-speed scanning can be achieved. Also, because the AO beam deflecting units can precisely deflect the input laser beams towards a desired location/direction, a small-sized photosensor 216 may be sufficient to receive the incident laser beam. In some embodiments, photosensor 216 includes a smaller photodetector array (e.g., than existing photodetector array) or even a single photodetector. In some embodiments of the present disclosure, photosensor 216 may include a single photodetector, e.g., a silicon PIN photodiode that utilize the photovoltaic effect to convert optical power into an electrical current.

Controller 222 may be configured to control transmitter 202 and/or receiver 204 to perform detection/sensing operations. In some embodiments, controller 222 may apply and adjust an acoustic wave signal to AO beam deflecting unit 220 to modulate its refractive index in order to deflect the input laser beam for a desired deflection angle. For example, controller 222 may be configured to determine the characteristics of the acoustic wave, e.g., frequency, according to the desired deflection angle.

Controller 222 may include components (not shown) such as a communication interface, a processor, a memory, and a storage for performing various control functions. In some embodiments, controller 222 may have different modules in a single device, such as an integrated circuit (IC) chip (implemented as, for example, an application-specific integrated circuit (ASIC) or a field-programmable gate array (FPGA)), or separate devices with dedicated functions. In some embodiments, the processor may include any appropriate type of general-purpose or special-purpose microprocessor, digital signal processor, or microcontroller. The memory or storage may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM. For example, the memory and/or the storage may be configured to store program(s) that may be executed by the processor to configure AO beam deflecting unit 220 to deflect the laser beams in desired directions.

Figure 6:
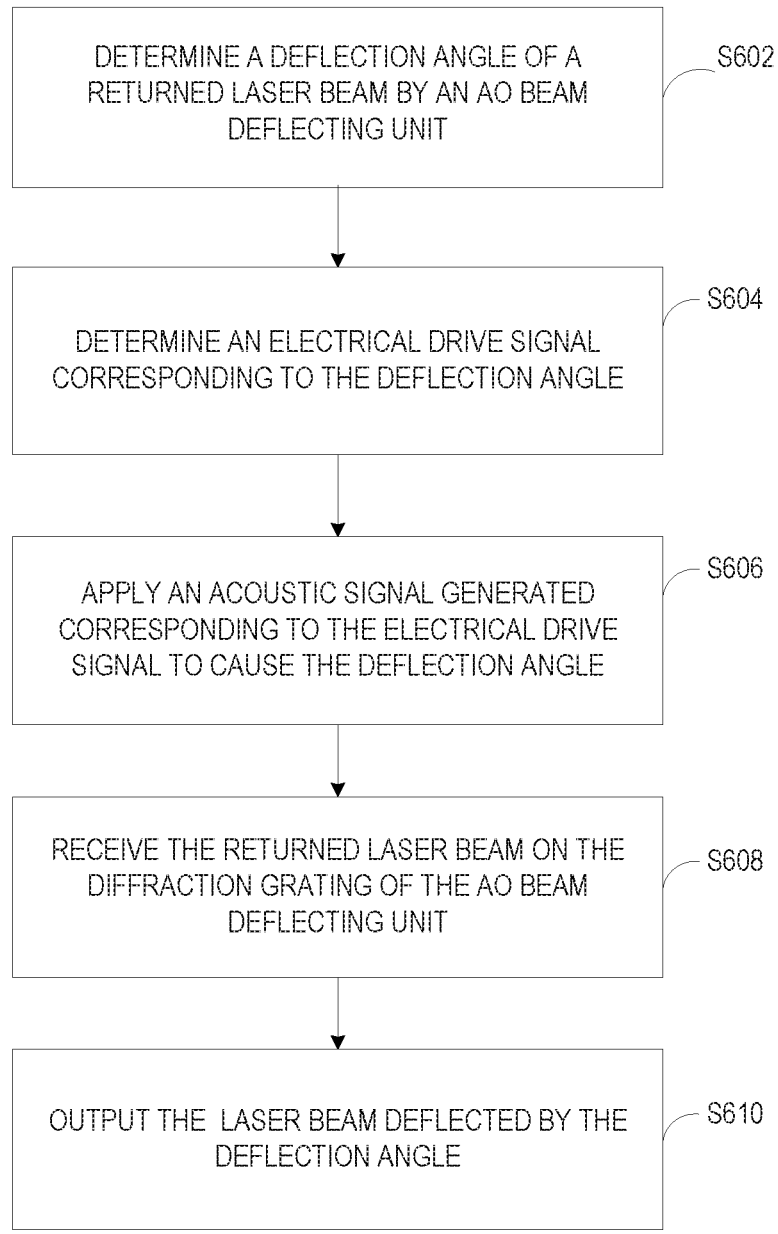
FIG. 6 illustrates a flowchart of an exemplary method to deflect a laser beam using an AO beam deflecting unit, according to embodiments of the disclosure.

FIG. 6 illustrates a method 600 using the disclosed AO beam deflecting unit to deflect laser beams in a receiver of a LiDAR system, according to embodiments of the present disclosure. Method 600 may be performed by automated or manual means. In some embodiments, method 600 is performed by controller 222.

At step S602, the beginning of method 600, a deflection angle of a returned laser beam by an AO beam deflecting unit is determined. The returned laser beam may be a laser beam emitted by a transmitter of the LiDAR system to an object and then returned from the object. In some embodiments, travel direction of the returned laser beam is determined based on the scanning direction of the laser beam, e.g., before impinging on the object. Based on the travel direction of the returned laser beam and the configuration of the receiver, e.g., dimensions of and distances between components, the deflection angle of the returned laser beam, by the AO beam deflecting unit, can be determined. In some embodiments, the respective deflection angle of each AO deflector in the AO beam deflecting unit is determined.

At step S604, an electrical drive signal is formed corresponding to the deflection angle. Based on the deflection angle of the AO beam deflecting unit, an acoustic frequency of an acoustic signal can be determined based on equation $$\Delta\theta_a = \frac{\lambda}{v}\Delta f.$$

Further, the electrical frequency that can cause a transducer to generate the acoustic signal with the acoustic frequency can be determined. The electrical drive signal can then be transmitted to the transducer, which generates and applies the acoustic signal, e.g., an acoustic wave, to the AO beam deflecting unit. A diffraction grating can be formed in the AO beam deflecting unit, modulating the refractive index of the AO beam deflecting unit. The modulated refractive index can cause the input laser beam to be deflected by the deflection angle. In some embodiments, when the AO beam deflecting unit includes more than one AO deflectors, a respective electrical drive signal to modulate the refractive index of each AO deflector can be determined, such that the output laser beam of the AO beam deflecting unit can travel towards a desired location/direction.

At step S606, the acoustic signal corresponding to the electrical drive signal is applied to the AO beam deflecting unit to cause the deflection angle. After the electrical drive signal, with the electrical frequency, is generated, the electrical drive signal may be applied to the transducer, which generates and applies the acoustic signal, e.g., an acoustic waveform, to the AO beam deflecting unit. As described in step S604, a diffraction grating can be formed and the refractive index of the AO beam deflecting unit can be modulated.

At step S608, the returned laser beam is received by the AO beam deflecting unit so that the returned laser beam impinges on the diffraction grating. For ease of illustration, the returned laser beam herein can be the returned laser beam before or after being converged by the lens in the receiver, e.g., similar to the input laser beam described in FIGS. 3A-3C. In some embodiments, the position and/or orientation of each AO deflector in the AO beam deflecting unit is adjusted or optimized such that a maximum portion of the returned laser beam (e.g., all of the returned laser beam) is received on the diffraction grating of each AO deflector. At step S610, the returned laser beam is deflected by the deflection angle. The deflected laser beam may then be outputted by the AO beam deflecting unit.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. A receiver for light detection and ranging (LiDAR), comprising:
   a beam converging device configured to receive a laser beam from an object being scanned by the LiDAR and form an input laser beam; and
   an acousto-optical (AO) beam deflecting unit configured to:
   generate a diffraction grating along a propagating direction of an acoustic wave;
   receive the input laser beam such that the input laser beam impinges upon the diffraction grating; and form an output laser beam towards a beam sensor, wherein an angle between the input and the output laser beams is nonzero.

2. The receiver of claim 1, wherein an angle between the input laser beam and a vertical direction is greater than an angle between the output laser beam and the vertical direction.

3. The receiver of claim 1, wherein the AO beam deflecting unit comprises at least one of germanium (Ge), doped glass, $Ge_{33}As_{12}Se_{55}$, $As_2S_3$, $PbMoO_4$, $TeO_2$, or $SiO_2$.

4. The receiver of claim 1, wherein the AO beam deflecting unit comprises an AO deflector placed between the beam converging device and the beam sensor.

5. The receiver of claim 4, wherein the AO beam deflecting unit comprises another AO deflector placed between the AO deflector and the beam sensor, and wherein the other AO deflector is configured to:
generate another diffraction grating along a propagating direction of another acoustic wave, and
receive an intermediate laser beam from the AO deflector such that the intermediate laser beam impinges upon the other diffraction grating, and
form the output laser beam towards the beam sensor, wherein an angle between the intermediate and the output laser beams is nonzero.

6. The receiver of claim 5, wherein:
an angle between the intermediate laser beam and the vertical direction is greater than an angle between the output laser beam and the vertical direction; and
the angle between the input laser beam and the vertical direction is greater than an angle between the intermediate laser beam and the vertical direction.

7. The receiver of claim 5, wherein
the AO deflector deflects the input laser beam by a first deflection angle;
the other AO deflector deflects the intermediate laser beam by a second deflection angle; and
the first deflection angle is equal to the second deflection angle.

8. The receiver of claim 5, wherein
the AO deflector deflects the input laser beam by a first deflection angle;
the other AO deflector deflects the intermediate laser beam by a second deflection angle; and
the first deflection angle is different from the second deflection angle.

9. The receiver of claim 1, wherein the beam converging device comprises a lens and the beam sensor comprises a photodetector.

10. The receiver of claim 1, wherein a refractive index of each respective AO deflector in the AO beam deflecting unit is in accordance with a configuration of the respective diffraction grating.

11. The receiver of claim 10, wherein the AO beam deflecting unit is configured to:
receive the respective acoustic wave from a respective transducer, a frequency of the acoustic wave corresponding to the configuration of the respective diffraction grating.

12. A receiver for light detection and ranging (LiDAR), comprising:
an acousto-optical (AO) beam deflecting unit configured to:
generate a diffraction grating along a propagating direction of an acoustic wave;
receive a first input laser beam from an object being scanned by the LiDAR such that the first input laser beam impinges upon the diffraction grating, and
form an output laser beam towards a beam sensor, wherein an angle between the first input laser beam and the output laser beams is nonzero; and
a beam converging device configured to receive the output laser beam and form a second input laser beam towards the beam sensor.

13. The receiver of claim 12, wherein an angle between the first input laser beam and a vertical direction is greater than an angle between the output laser beam and the vertical direction.

14. The receiver of claim 12, wherein the AO beam deflecting unit comprises at least one of germanium (Ge), doped glass, $Ge_{33}As_{12}Se_{55}$, $As_2S_3$, $PbMoO_4$, $TeO_2$, or $SiO_2$.

15. The receiver of claim 12, wherein the AO beam deflecting unit comprises an AO deflector, the beam converging device being placed between the AO deflector and the beam sensor.

16. The receiver of claim 12, wherein the AO beam deflecting unit further comprises another AO deflector between the beam converging device and the beam sensor, wherein the other AO deflector is configured to:
generate another diffraction grating along a propagating direction of another acoustic wave,
receive the second input laser beam from the beam converging device such that the second input laser beam impinges upon the other diffraction grating, and
form another output laser beam towards the beam sensor.

17. The receiver of claim 12, wherein the beam converging device comprises a lens and the beam sensor comprises a photodetector.

18. A method for receiving a laser beam in a light detection and ranging (LiDAR), comprising:
determining a travel direction of the laser beam from an object being scanned by the LiDAR to a beam sensor;
generating, in an acousto-optical (AO) deflector, a diffraction grating along a propagating direction of an acoustic wave;
receiving, by the AO deflector, the laser beam from the object such that the laser beam impinges upon the diffraction grating; and
deflecting, by the AO deflector, the laser beam towards the beam sensor.

19. The method of claim 18, wherein determining the travel direction of the laser beam comprises determining a deflection angle of the laser beam by the AO deflector.

20. The method of claim 19, wherein generating the diffraction grating comprises:
determining, based on the deflection angle of the laser beam, a reflective index of the AO deflector;
determining the diffraction grating in the AO deflector, a configuration of the diffraction grating corresponding to the refractive index;
determining a frequency of the acoustic wave, the frequency corresponding to the configuration of the diffraction grating; and
determining an electrical drive signal applied on a transducer that generates the acoustic wave.

* * * * *